United States Patent
Burns et al.

(10) Patent No.: US 8,694,131 B2
(45) Date of Patent: Apr. 8, 2014

(54) SYSTEM AND METHOD FOR CONTROLLING OPERATIONS OF VAPOR COMPRESSION SYSTEM

(75) Inventors: Dan J. Burns, Arlington, MA (US); Scott A. Bortoff, Brookline, MA (US); Christopher Laughman, Waltham, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 232 days.

(21) Appl. No.: 13/077,698

(22) Filed: Mar. 31, 2011

(65) Prior Publication Data

US 2011/0209486 A1    Sep. 1, 2011

(51) Int. Cl.
| | | |
|---|---|---|
| G05B 13/02 | (2006.01) |
| G06F 19/00 | (2011.01) |
| G01M 1/38 | (2006.01) |
| G05D 23/00 | (2006.01) |
| F24F 7/00 | (2006.01) |
| F25B 49/00 | (2006.01) |
| F25B 17/04 | (2006.01) |
| F25D 17/06 | (2006.01) |
| G06F 1/26 | (2006.01) |

(52) U.S. Cl.
USPC ............ 700/38; 700/28; 700/121; 700/276; 700/300; 236/49.3; 62/132; 62/186; 62/426; 713/320

(58) Field of Classification Search
CPC ...... F24F 11/006; G05B 5/01; F02D 41/1408
USPC .......... 700/28–29, 31, 33, 38, 121, 276, 300; 236/49.3; 62/132, 186, 426; 713/320
See application file for complete search history.

(56) References Cited

U.S. PATENT DOCUMENTS

| | | | |
|---|---|---|---|
| 5,735,134 A | 4/1998 | Liu et al. | |
| 6,098,010 A * | 8/2000 | Krener et al. | ................. 701/100 |
| 6,742,347 B1 | 6/2004 | Kolk et al. | |
| 2003/0115895 A1 | 6/2003 | Beaverson et al. | |

(Continued)

FOREIGN PATENT DOCUMENTS

| | | |
|---|---|---|
| EP | 1715184 A1 | 10/2006 |
| WO | 2005026854 A1 | 3/2005 |
| WO | 2009012269 A2 | 1/2009 |
| WO | 2009012282 A2 | 1/2009 |

OTHER PUBLICATIONS

Krstic et al. Stability of extemum seeking feedback for general non-linear dynamic systems, Automatica 36 (2000) 595-601.*

*Primary Examiner* — Darrin Dunn
(74) *Attorney, Agent, or Firm* — Gene Vinokur; Dirk Brinkman

(57) ABSTRACT

A system and a method for controlling an operation of a vapor compression system are disclosed, such that a performance of the system measured in accordance with a metric of the performance is optimized. A control signal is modified with a modification signal including a perturbation signal having a first frequency, wherein the control signal controls at least one component of the vapor compression system. A metric signal representing a perturbation in the performance of the system caused by the modification signal is determined, wherein the metric signal has a second frequency substantially equal to the first frequency. The control signal is adjusted based on a function of a phase between the perturbation signal and the metric signal, such that the performance is optimized.

17 Claims, 9 Drawing Sheets

(56) References Cited

U.S. PATENT DOCUMENTS

| | | | |
|---|---|---|---|
| 2009/0277197 A1* | 11/2009 | Gambiana et al. | 62/115 |
| 2011/0209486 A1* | 9/2011 | Burns et al. | 62/115 |
| 2011/0276182 A1* | 11/2011 | Seem et al. | 700/276 |
| 2012/0083926 A1* | 4/2012 | Seem | 700/276 |
| 2012/0239165 A1* | 9/2012 | Li et al. | 700/28 |

* cited by examiner

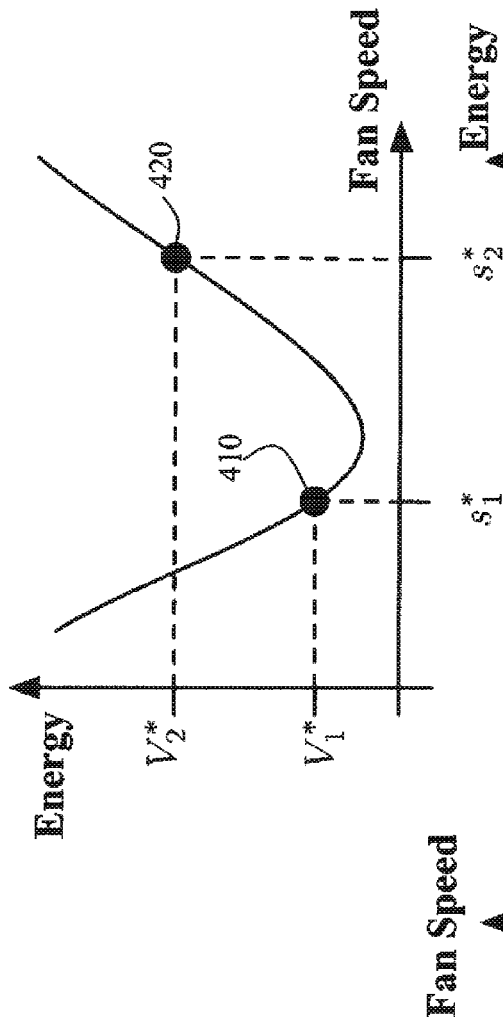
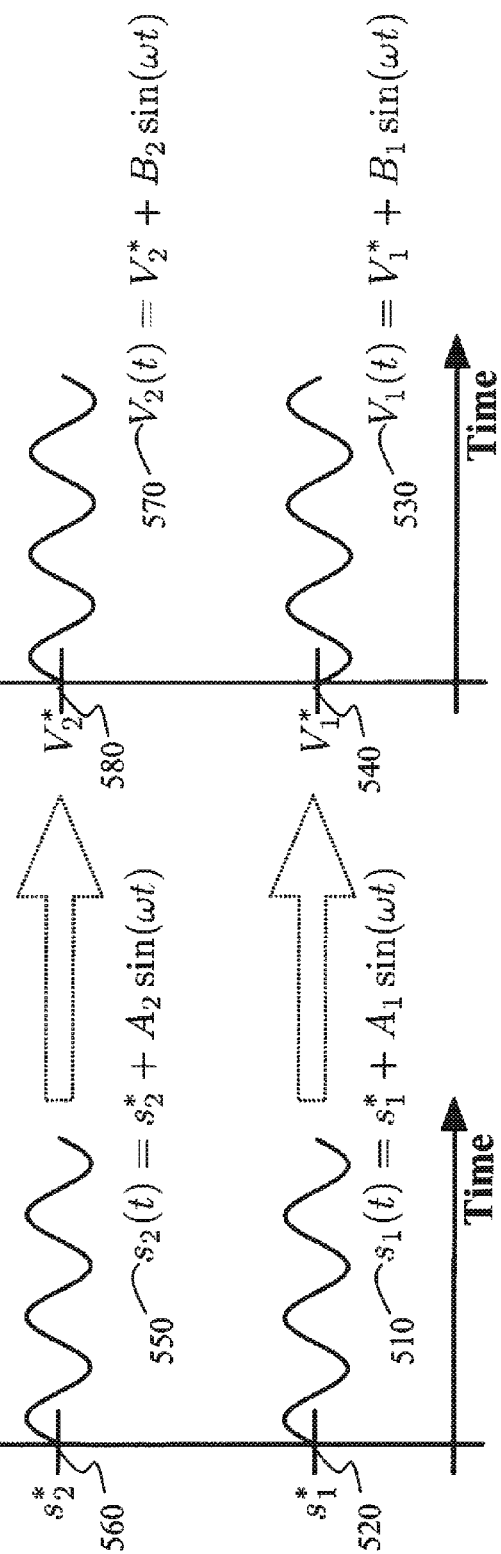
FIG. 5A
FIG. 5B
FIG. 5C

600

SYSTEM AND METHOD FOR CONTROLLING OPERATIONS OF VAPOR COMPRESSION SYSTEM

FIELD OF THE INVENTION

This invention relates generally to vapor compression systems, and more particularly to controlling operations of the vapor compression system.

BACKGROUND OF THE INVENTION

Vapor compression systems, such as heat pumps, refrigeration and air-conditioning systems, are widely used in industrial and residential applications. The introduction of variable speed compressors, variable position valves, and variable speed fans to the vapor compression cycle has greatly improved the flexibility of the operation of such systems. It is possible to use these new components to improve the efficiency of vapor compression systems by controlling the components correctly.

For example, a speed of the compressor can be adjusted to modulate a flow rate of a refrigerant. The speed of an evaporator fan and a condenser fan can be varied to alter heat transfer coefficients between air and heat exchangers. The change in an expansion valve opening can directly influence a pressure drop between the high-pressure side and the low-pressure side of the vapor compression system, which, in turn, affects the flow rate of the refrigerant as well as superheat at the corresponding evaporator outlet.

The combination of commanded inputs to the vapor compression system that delivers a particular amount of heat is often not unique and these various combinations consume different amounts of energy. Therefore, it is desirable to operate the vapor compression system using the combination of inputs that minimizes energy and thereby maximizes efficiency.

Conventionally, methods maximizing the energy efficiency rely on the use of mathematical models of the physics of vapor compression systems. Those model-based methods attempt to describe the influence of commanded inputs of the components of the vapor compression system on the thermodynamic behavior of the system and the consumed energy. In those methods, models are used to predict the combination of inputs that both meets the heat load requirements and minimizes energy.

However, the use of mathematical models for the selection of optimizing inputs has several important drawbacks. Firstly, models rely on simplifying assumptions in order to produce a mathematically tractable representation. These assumptions often ignore important effects or do not consider installation-specific characteristics such as room size, causing the model of the system to deviate from actual behavior of the system.

Secondly, the variation in these systems during the manufacturing process are often so large as to produce vapor compression systems of the same type that exhibit different input-output characteristics, and therefore a single model cannot accurately describe the variations among copies produced as the outcome of a manufacturing process.

Thirdly, these models are expensive to derive and calibrate. For example, parameters that describe the operation of a component of a vapor compression system, e.g., a compressor, are experimentally determined for each type of the compressor used, and a model of a complete vapor compression system may have dozens of such parameters. Determining the values of these parameters for each model is an extensive effort. Finally, vapor compression systems are known to vary over time. A model that accurately describes the operation of a vapor compression system at one point in time may not be accurate at a later time as the system changes, for example, due to slowly leaking refrigerant or the accumulation of corrosion on the heat exchangers.

FIG. 1 shows a conventional vapor compression system 100 that includes components, e.g., variable setting actuators. The components may include an evaporator fan 114, a condenser fan 113, an expansion valve 111 and a compressor 112. The system can be controlled by a controller 120 responsible for accepting setpoints 115, e.g., from a thermostat, and readings of a sensor 130, and outputting a set of control signals for controlling operation of the components. The controller 120 is operatively connected to a set of control devices for transforming the set of control signals into a set of specific control inputs for corresponding components. For example, controller is connected to a compressor control device 122, to an expansion valve control device 121, to an evaporator fan control device 124, and to a condenser fan control device 123.

In this manner, the controller controls operation of the vapor compression system such that the setpoint values are achieved for a given heat load.

However, the operation of the system can be not optimal. In consideration of the above, there is a need in the art for a method for controlling operation of the vapor compression system such that heat load of the operation is met and a performance of the system is optimized, where the method is not model-based and can adapt over time as the system characteristics evolve.

SUMMARY OF THE INVENTION

It is an object of present invention to provide a system and a method for controlling operation of a vapor compression system such that heat load requirements of the operation are met, and a performance of the system is optimized.

It is further object of the invention to provide such a system and a method without using a model of the vapor compression system.

It is further object of the invention to provide such a system and a method that optimizes the performance of the system over time during the operation of the system even if the characteristics of the system evolves.

It is further object of the invention to provide such a system and a method that optimizes performance of entire vapor compression system by controlling one or several components of the system.

It is further object of the invention to provide such a system and a method that optimizes performance of the system in real time during the operation of the system.

It is further object of the invention to provide such a system and a method that have a simple design and can be adapted to various metrics of performance of the system.

It is further object of present invention to provide such a system and a method that enable the optimization of performance even in a presence of a sudden change of the heat load during the operation of the system.

Some embodiments of the invention disclose a system and a method for controlling at least one component of a vapor compression system, such that a performance of the system, measured in accordance with a metric of performance, is optimized, e.g., maximized or minimized, during an operation of the vapor compression system.

Some embodiments of the invention are based on a realization that there is a convex relationship between an operation of a component of the vapor compression system and the performance of the system. The embodiments determine the relationship between the component and the performance at an operation point during the operation of the system, and use the relationship to modify a control signal controlling the operation of the component to optimize the performance, e.g., to minimize energy consumption of the system, or to maximize efficiency of the system. In various embodiments, the operation of one or several components is modified to optimize the performance. However, in one embodiment, the modification of the operation on one component optimizes the performance of the entire vapor compression system.

This realization also allows optimizing the performance in real time during the operation of the vapor compression system and without using the model of the system. Also, because the performance is optimized in real time, the change of the characteristics of the vapor compression system, such as leak of refrigerant or corrosion on the heat exchangers, has minimal effect on the embodiments.

Some embodiments are based on another realization that if the control signal is perturbed with sinusoidal signal, the response of the vapor compression system caused by that perturbation is also sinusoidal and the convex relationship can be determined based on a function of phase between the sinusoidal signals. This realization allows determining the convex relationship using trigonometric operations, which simplifies the design and the complexity of some embodiments. Also, this realization enables some embodiments to optimize the performance even in a presence of a sudden change of the heat load during the operation of the system. This is because response of the system to a sinusoidal perturbation is also sinusoidal with the same frequency. Thus, the changes to the heat load of the system, e.g., opening a window in a room, can be treated as noise of the sinusoidal response of the system and can be removed.

For example, one aspect of an invention discloses a method for controlling an operation of a vapor compression system, such that a performance of the system measured in accordance with a metric of performance is optimized. The method includes steps of modifying a control signal with a modification signal including a perturbation signal having a first frequency, wherein the control signal controls at least one component of the vapor compression system; determining a metric signal representing a perturbation in the performance of the system caused by the modification signal, wherein the metric signal has a second frequency substantially equal to the first frequency; and adjusting the control signal based on a function of a phase between the perturbation signal and the metric signal, such that the performance is optimized, wherein the steps of the method are performed by a processor.

For example, the function of the phase can include at least one of a sign of the phase, and a shift of the phase. The metric of the performance can include an efficiency of the vapor compression system, and the adjusting also includes increasing a value of the control signal, if the phase is positive; and decreasing the value of the control signal, if the phase is negative. Alternatively, the metric of metric of the performance can include an energy consumption of the vapor compression system, and the adjusting further includes decreasing a value of the control signal, if the phase is positive; and increasing the value of the control signal, if the phase is negative.

In some embodiment, the method can determine a modification value, e.g., based on the function of the phase, and can change a value the modification signal based on the modification value. Alternatively, the method can change a value of the control signal based on the modification value.

In some embodiment, the method can include measuring an output signal of the vapor compression system representing the performance; and subjecting the output signal to a high-pass filter to produce the metric signal. The method can also include subjecting a product of the perturbation signal and the metric signal to a low-pass filter to produce a constant term of the product, wherein a sign of the constant term corresponds to the function of the phase; and determining a modification value based on the constant term.

In one embodiment, the method can include combining the modification value with the perturbation signal to produce the modification signal.

In some embodiments, the method can produce the modification value by integrating the constant term. Additionally or alternatively, the method can update the modification value by integrating the constant term. The method can also include multiplying the modification value with a gain factor, wherein a sign of the gain factor depends on the metric of performance. For example, the sign of the gain factor is positive, if the performance should be maximized. Alternatively, the sign of the gain factor is negative, if the performance should be minimized. The gain factor allows for changing the embodiment adaptively in dependence of the metric of performance.

Another aspect of the invention discloses a method for controlling an operation of a vapor compression system, such that a performance of the system measured in accordance with a metric of performance is optimized, wherein at least one component of the system is controlled based on a control signal. The method includes modifying periodically the control signal with a modification signal having a modification value and a perturbation signal; and adjusting adaptively the modification value based on a function of the perturbation signal and an metric signal representing a perturbation in the performance caused by the modification signal, wherein the perturbation signal and the metric signal are sinusoidal signals having substantially identical frequency.

In one embodiment, the method can also include one or combination of determining a product of the perturbation signal and the metric signal, wherein the product includes a constant term and a sinusoidal term; updating the modification value based on a sign of the constant term; and multiplying the modification value by a gain factor, wherein a sign of the gain factor depends on the metric of performance.

Another aspect of the invention discloses an optimization controller for optimizing a performance of a vapor compression system measured in accordance with an metric of performance. The optimization controller can include a perturbation module for generating a perturbation signal; a high-pass filter for determining a metric signal in response to receiving an output signal representing the performance of the system; a low-pass filter for determining a constant term of a product of the perturbation signal and the metric signal; an integrator for determining a modification value based on a sign of the constant term; and an optimization module for combining the modification value with the perturbation signal to output the modification signal suitable for modifying a control signal of at least one component of the system, such that the performance is optimized.

In various embodiments, the optimization controller can also include one or combination of a gain factor module for multiplying the modification value by a gain factor, wherein a sign of the gain factor depends on the metric of performance; a delay module for delaying the output of the modification signal; a receiver for receiving the output signal; and a modification module for modifying the control signal with the modification signal.

Definitions

In describing embodiments of the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "control system" refers to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

A "computer system" refers to a system having a computer, where the computer comprises computer-readable medium embodying software to operate the computer.

A "network" refers to a number of computers and associated devices that are connected by communication facilities. A network involves permanent connections such as cables, temporary connections such as those made through telephone or other communication links, and/or wireless connections. Examples of a network include an internet, such as the Internet; an intranet; a local area network (LAN); a wide area network (WAN); and a combination of networks, such as an internet and an intranet, A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. The vapor compression systems are used in applications beyond the conditioning of residential or commercial spaces. For example, the vapor compression cycle can be used by the vapor compression system to cool computer chips in high-performance computing applications A "HVAC" system refers to any heating, ventilating, and air-conditioning (HVAC) system implementing the vapor compression cycle. HVAC systems span a very broad set of systems, ranging from systems which supply only outdoor air to the occupants of a building, to systems which only control the temperature of a building, to systems which control the temperature and humidity.

"Components of a vapor compression system" refer to any components of the vapor compression system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor-compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor-compression system.

"Set of control signals" refers to specific values of the inputs for controlling the operation of the components of the vapor compression system. The set of control signals includes, but are not limited to, values of the speed of the compressor, the position of the expansion valve, the speed of the fan in the evaporator, and the speed of the fan in the condenser.

A "setpoint" refers to a target value the system, such as the vapor compression system, aim to reach and maintain as a result of the operation. The term setpoint is applied to any particular value of a specific set of control signals and thermodynamic and environmental parameters.

BRIEF DESCRIPTION OF THE DRAWINGS

FIGS. 5A-5C are schematics of input-output behavior of a convex performance index at two operating points when sinusoidal signals are applied;

DETAILED DESCRIPTION OF EMBODIMENTS OF INVENTION

Figure 1:
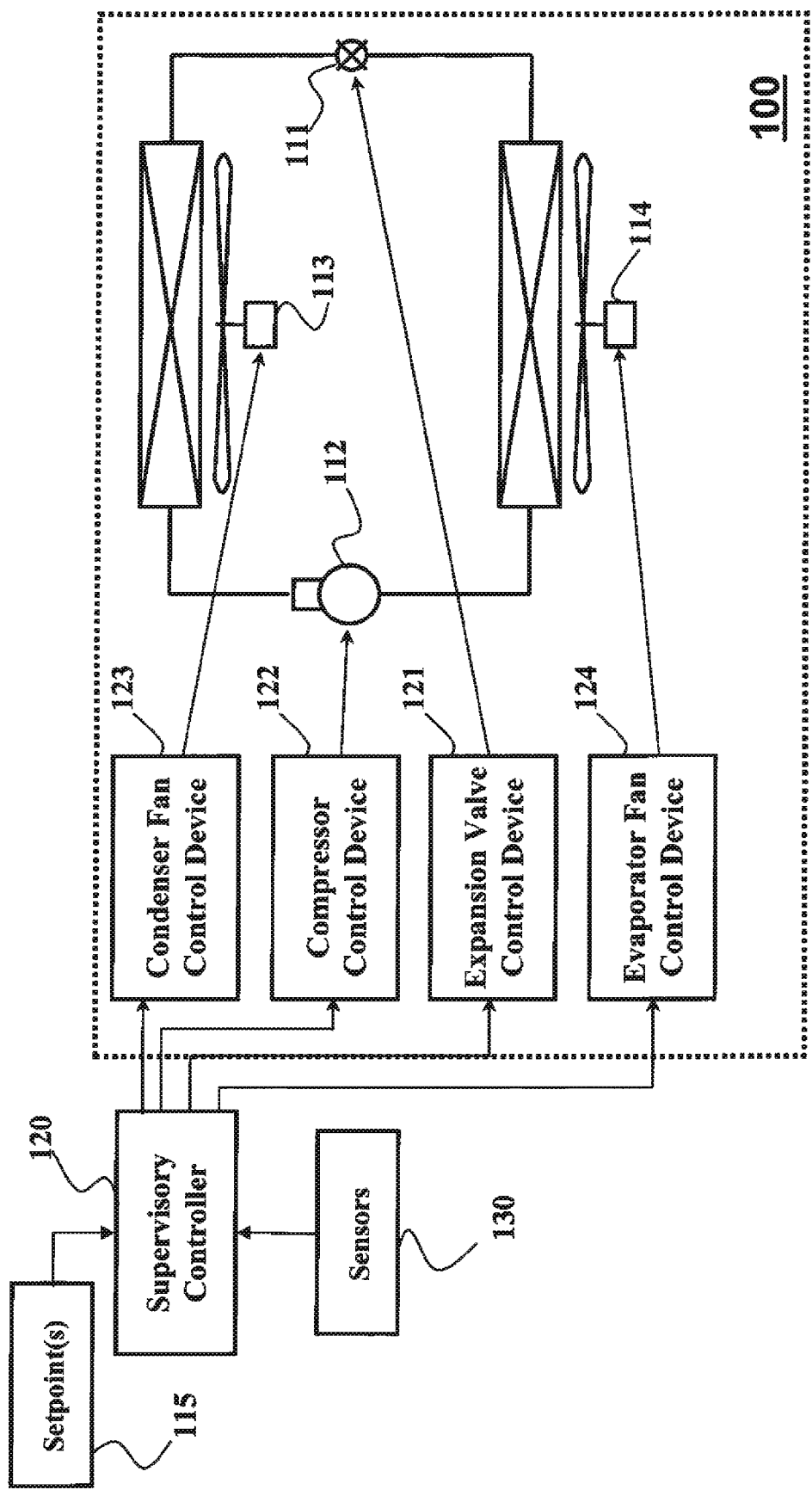
FIG. 1 is a block diagram of conventional vapor compression system.
Figure 2:
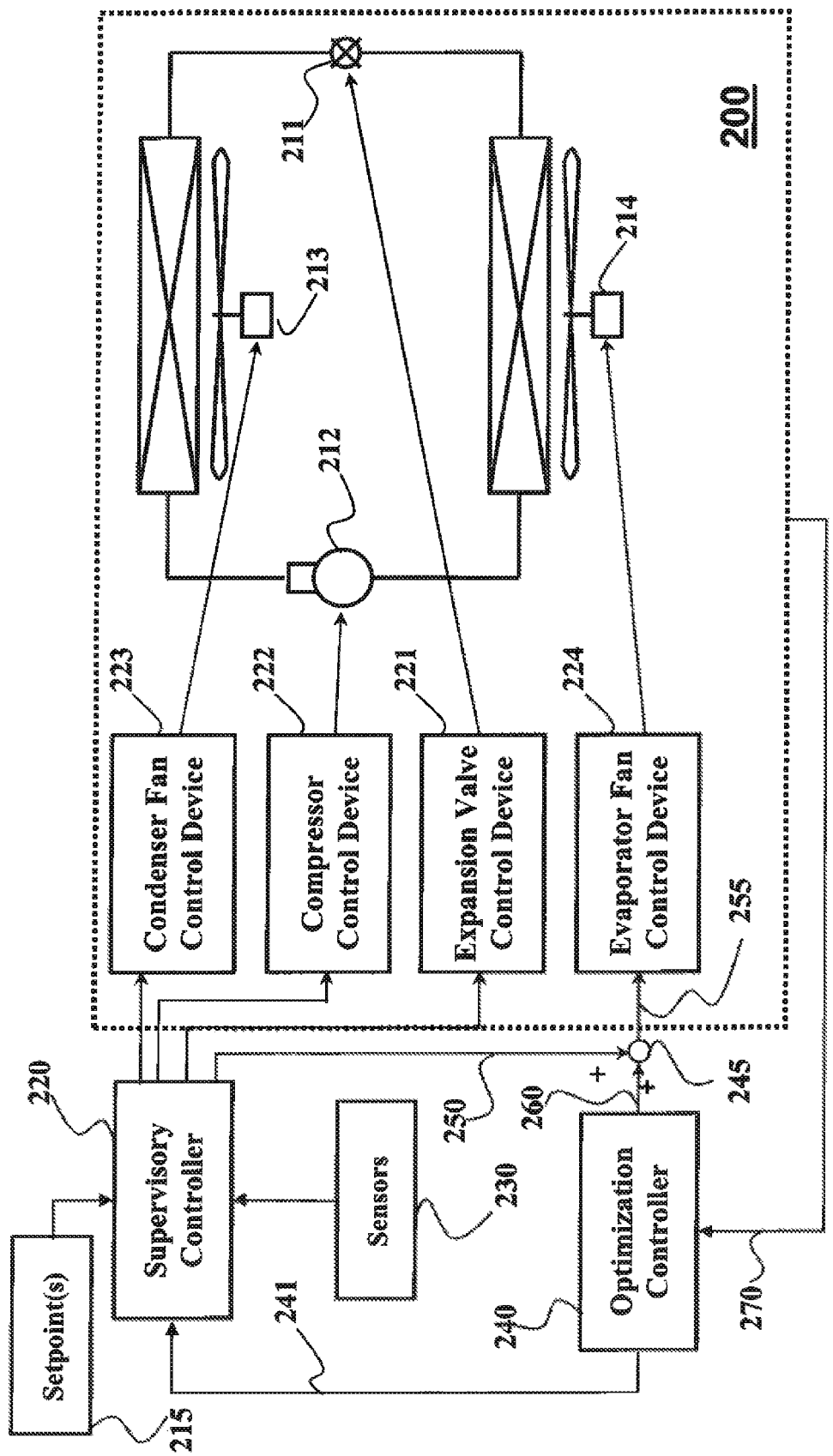
FIG. 2 is a block diagram of an energy optimizing controller integrated with a vapor compression system according to some embodiments of invention.

FIG. 2 shows a block diagram of a vapor compression system 200 according to one embodiment of the invention configured to optimize the performance of the system. Similarly to the system 100, the system 200 may include one or combination of an evaporator fan 214, a condenser fan 213, an expansion valve 211, and a compressor 212, a compressor control device 222, an expansion valve control device 221, an evaporator fan control device 224, and a condenser fan control device 223. The system 200 is controlled by a supervisory controller 220 responsible for accepting setpoints 215 and readings of a sensor 230, and outputting a set of control signals for operation of the components of the system 200. Other configurations of the system 200 are possible.

The system 200 is also controlled by an optimization controller 240 for modifying a control signal outputted by the supervisory controller to at least one control device. For example, the optimization controller modifies the control signal outputted to the evaporator fan control device 244. In one embodiment, the optimization controller modifies 245 the control signal 250 by adding a modification signal 260 to the value of the control signal. The modification signal includes a perturbation signal. The perturbation signal is a sinusoidal signal having a first frequency. In one embodiment, the modification signal also includes a modification value.

The objective of the optimization controller is to optimize the performance of the system measured in accordance with a metric of performance. Examples of the metric include, but are not limited to, an energy consumed by the system during the operation, and efficiency of the system.

The optimization controller receives an output signal 270 of the vapor compression system representing the performance of the system measured in accordance with the metric of performance. For example, the output signal can represent the energy consumed by the system. The output signal includes a metric signal representing a perturbation in the performance of the system caused by the modification signal. The metric signal is a sinusoidal signal having a second frequency substantially equal to the first frequency of the perturbation signal.

In various embodiments, the optimization controller adjusts the control signal based on a function of a phase between the perturbation signal and the metric signal, such that the performance is optimized. For example, the optimization controller determines the modification value, e.g., as a function of the phase, and add this modification value to the modification signal 260. Additionally or alternatively, the optimization controller can transmit 241 the modification valued to the supervisory controller in order to modify the control signal 250.

Figure 3A:
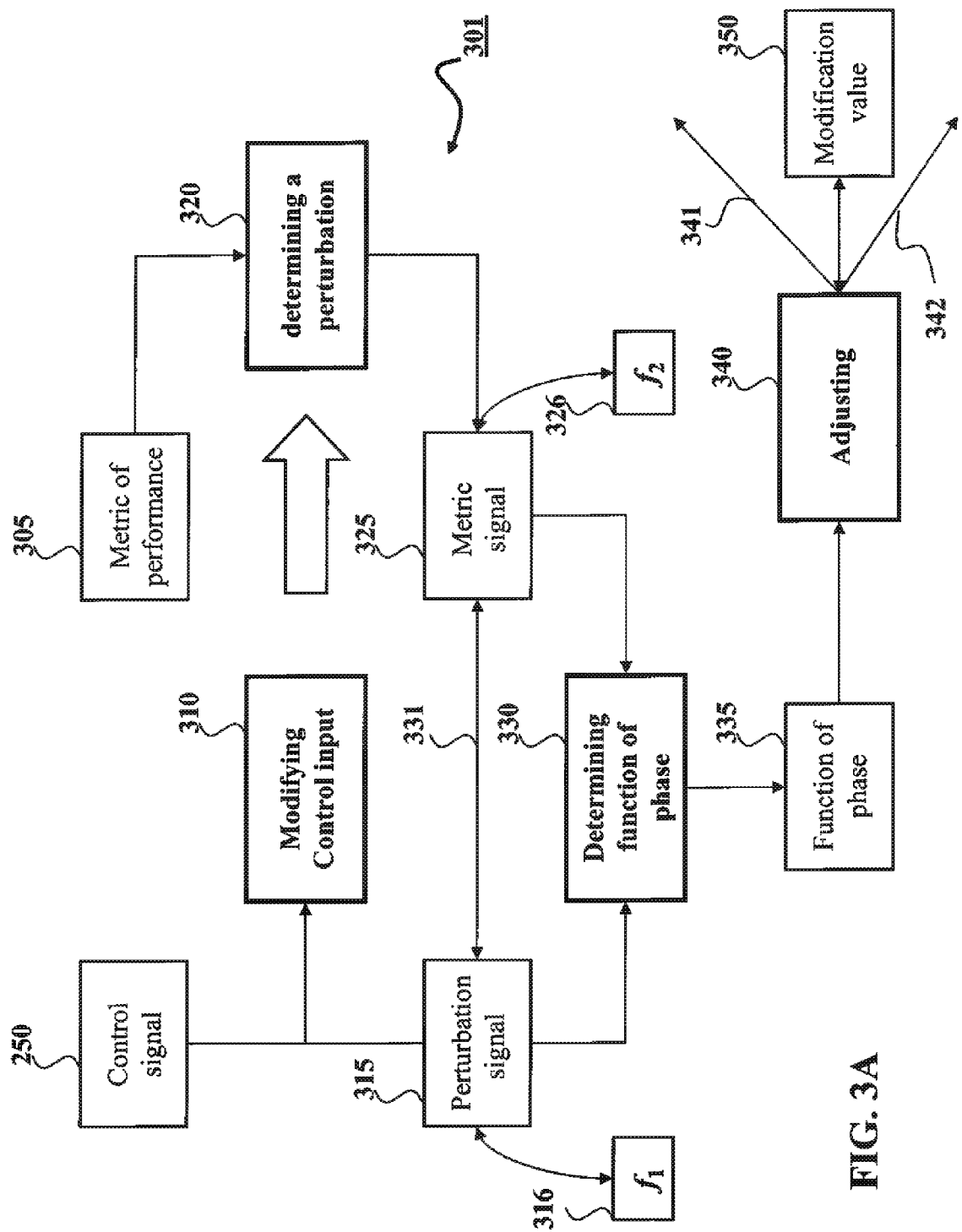
FIGS. 3A-3B shows block diagrams of a method for optimizing a performance of the system according to various embodiments of the invention.

FIG. 3A shows a block diagram of a method for controlling the operation of the vapor compression system in accordance with one embodiment, such that the performance is optimized in accordance with the metric of performance 305. In various embodiments, steps of the method are performed by a processor 301.

The control signal 250 is modified 310 with the modification signal including a perturbation signal 315 having a first frequency 316. A metric signal 325 representing a perturbation in the performance of the system caused by the modification signal is determined 320, wherein the metric signal has a second frequency 326 substantially equal 331 to the first frequency 315.

Next, the value of the control signal 250 is adjusted 340 based on based on a function of a phase 325 determined 330 between the perturbation signal and the metric signal. In various embodiments, the function of the phase includes one or combination of a sign of the phase or a shift of the phase. The control signal is adjusted such that the performance is optimized. For example, in one embodiment, the metric of performance is the energy consumption of the system, and thus, the performance should be minimized. In this embodiment, the adjusting includes decreasing 342 the value of the control signal, if the phase is positive; and increasing 341 the value of the control signal, if the phase is negative.

In alternative embodiment, the metric of performance is the efficiency of the system, and the performance should be maximized. In this embodiment, the changing includes increasing 341 the value of the control signal, if the phase is positive; and decreasing 342 the value of the control signal, if the phase is negative. Some embodiments determine a modification value 350 and adjust the control signal based on the modification value. One embodiment adjusts the control signal with the modification value by commanding the supervisory controller to add the modification value to the control signal 250. Another embodiment, adjusts the control signal with the modification value by adding the modification value to the modification signal. In this embodiment, the control signal is adjusted with the modification value during the modification 245.

Figure 3B:
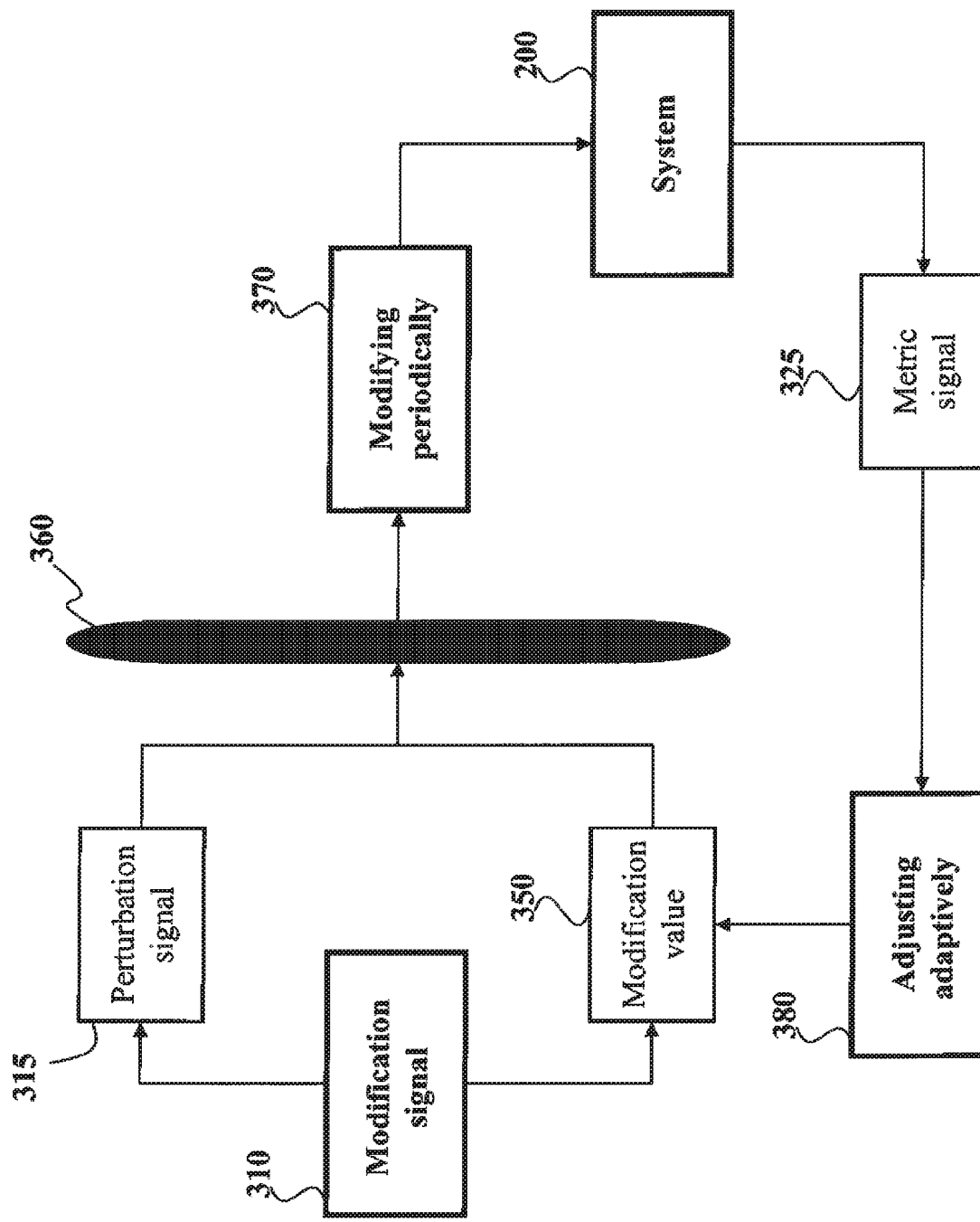

Various embodiments modify the control signal periodically with the modification signal during at least a part of the operation of the vapor compression system, as shown in FIG. 3B. The modification signal includes the modification value 350 and the perturbation signal 315. During the operation, the modification value is adjusted 380 adaptively as a function of the metric signal 325 and the perturbation signal 315. Typically, the perturbation signal remains unchanged, but the metric signal is changing in response to the modification of the control signal. The control signal is modified periodically 370 due to a delay 360 which may be required for the system 200 to react to the modifications, such that the metric signal is changed and reached a steady state. Next, the modification value is adjusted, e.g., increased or decreased, to adapt to the changes in the metric signal caused by previous modification.

Figure 4A:
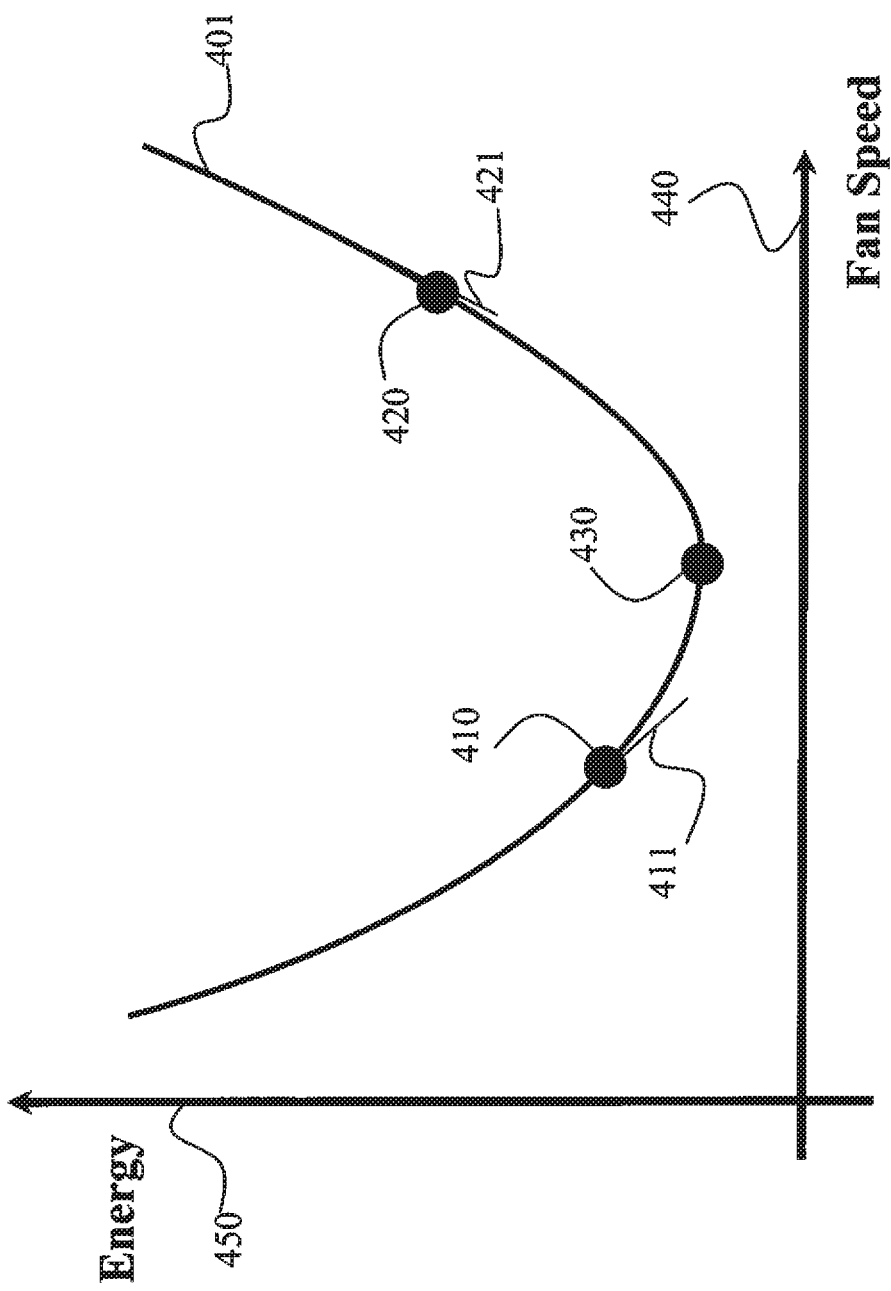
FIGS. 4A-4B is an example of a convex relationship between evaporator fan speed and energy consumed by the vapor compression system.

FIG. 4A shows a performance curve 401 illustrating the convex relationship between the operational values of the component, e.g., the speed 440 of the evaporator fan, and the performance, e.g., the energy 450 consumed by the system. For example, a point 430 corresponds to an operating point where current speed of the fan speed is optimal, e.g., the speed of the fan causes the system to operate at minimum energy consumption. A point 410 corresponds to an operating point where the current speed of the fan is lower than the optimal speed, and a point 420 corresponds to an operating point where the current speed of the fan is higher than the optimal speed. In various embodiments, the energy refers to total or overall energy consumed by the entire vapor compression system.

Some embodiments are based on a realization that the slope 411 and a slope 421 can indicate whether the control signal corresponding to the speed of the fan should be decreased or increased to optimize the performance. For example, the slope 411 indicates that that the speed of the fan should be increased in order to minimize the energy. In contrast, the slope 421 indicates that the speed should be decreased.

Figure 4B:
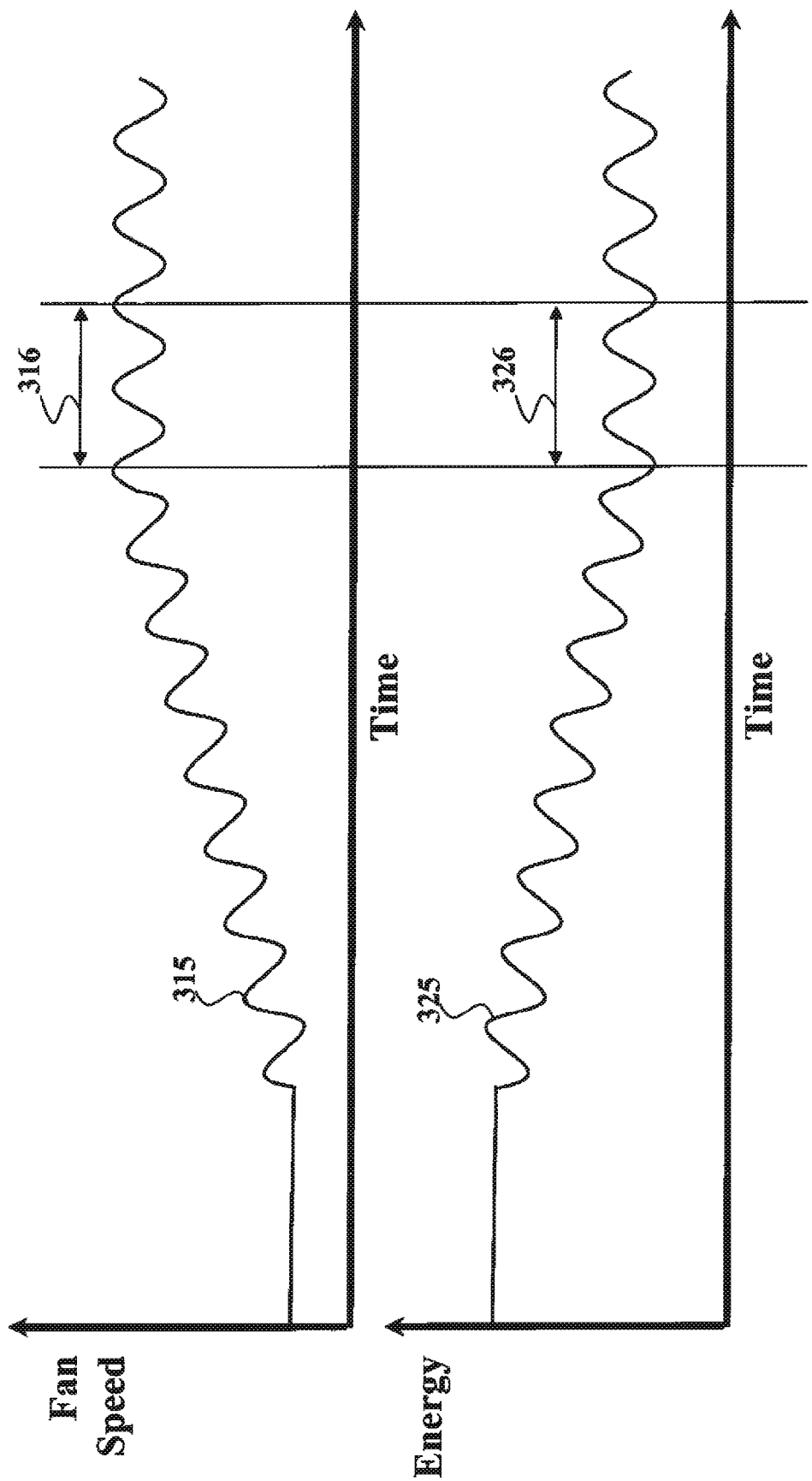

FIG. 4B shows a graph of changes of the control signal corresponding to the speed of the fan and the energy consumed by the system. The control signal is adjusted adaptively over time. Also, the modified control signal and the metric signal are sinusoidal signals, which allow distinguishing between the changes in the performance due to the sinusoidal changes of the control signal from the changes caused by other disturbance, e.g., a change in the heat load. Also, the sinusoidal nature of the signals allows analyzing the convex relationship based on the phase of the sinusoidal signals.

Referring to FIG. 2, the modification signal s(t) 315 includes a modification value s*, and a perturbation signal A sin(wt).

$$s(t)=s^*+A\sin(wt).$$

At the beginning of the operation, the modification value can be zero. However, during the operation of the vapor compression system, the modification value enables to optimize the control signal, and the sinusoidal perturbation enables to periodically adjust the modification value to preserve the optimality.

For example, the supervisory controller may command the evaporator fan to rotate at 600 rpm, and the optimization controller may adjust that signal by adding a modification value corresponding to 50 rpm. The optimization controller further adds a sinusoidal perturbation in order to estimate the slope of the curve of the index of performance at the current operating point. In this example, the modified control signal 255 transmitted to the control device, e.g., the control device 224, is 650 rpm plus the perturbation signal. The perturbation signal is used to further adjust the modification value 50 rpm in order to drive the system to the optimal operating point.

The rationale of the embodiments and the convex relationship of the sinusoidal signals are further explained with help of an example, and with reference to FIGS. 5A-5C. Suppose the vapor compression system is operating in cooling mode (the indoor heat exchanger is an evaporator) and the goal is to regulate the indoor temperature while consuming the minimum possible energy. For the purpose of this example, an initial steady state operating point on the curve is 410, so that the speed of the fan is too low for optimal energy consumption and the indoor room temperature equals the setpoint temperature. A supervisory controller generates N vapor compression system control signals. The N−1 control signals are sent directly to the respective control devices and value of one control signal is modified by the optimization controller.

The optimization controller adds to the control signal a signal $s_1(t)$ 510, which includes the perturbation signal $A_1 \sin(wt)$ and the modification value $s_1^*$ 520. The sinusoidal perturbation enables estimation of the slope of the curve of the index of performance, as described below.

For example, the initial part of the sinusoidal perturbation signal $s_1(t)$ 510 is increasing, i.e. sin(wt) function started at t=0. The increasing part of the sinusoidal signal causes the speed of the fan to increase, which in turn increases the heat transfer across the evaporator and lower the indoor temperature. The supervisory controller detects this lowered temperature as part of its normal function and commands the compressor to decrease its speed since less cooling is needed to achieve the setpoint temperature.

Because the compressor consumes the largest amount of energy in the vapor compression system, the overall energy consumption is decreased. This decrease is measured as output signal of the performance $V_1(t)$ 530 having phase, i.e., due to the metric signal, opposite of the perturbation signal. Because the phase of $V_1(t)$ 530 is shifted by about 180 degrees as compared to $s_1(t)$ 510, the slope of the curve at the current operating point 410 is negative. The optimization controller uses this slope information to change the modification value $s_1^*$ 520 of the modification signal in such a way as to cause energy consumption value $V_1^*$ 540 to approach its optimum value. The optimization controller continues changing the modification value of the speed of the evaporator fan until a minimum in energy consumption is reached, and the system is operating at point 430. In this manner, the optimization controller can provide a dramatic influence on energy savings despite only controlling one control device.

Similarly, if the initial operating point of the vapor compression system is at the point 420 and a sinusoidal perturbation signal $s_2(t)$ 550 is applied, the energy response $V_2(t)$ 570 is largely in phase with the sinusoidal perturbation, and the optimization controller determines that the slope of the performance curve at the current operating point is positive. Therefore, the optimization controller decreases the modification value of the command input $s_2^*$ 560 causing the energy consumed $V_2^*$ 580 to decrease, ultimately driving the system to operate at point 430.

In the above describes examples where the metric of performance is energy consumption and therefore the object is to minimize the performance. Some embodiments use different metric of performance, e.g., an efficiency of the system. Those embodiments modify the optimization controller to maximize the performance.

Figure 6:
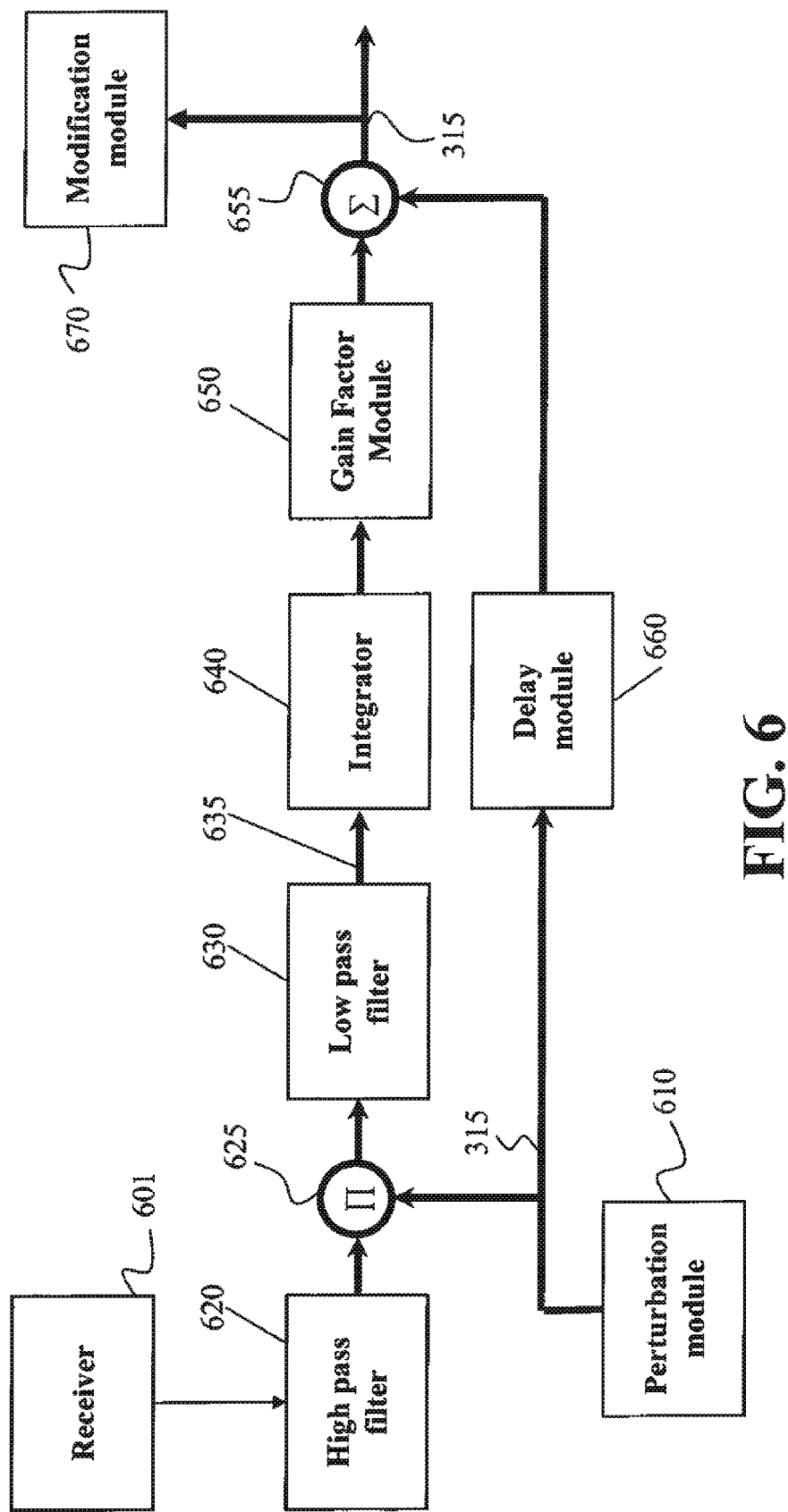
FIG. 6 is a block diagram of an optimization controller according to one embodiment of the invention.
Figure 7:
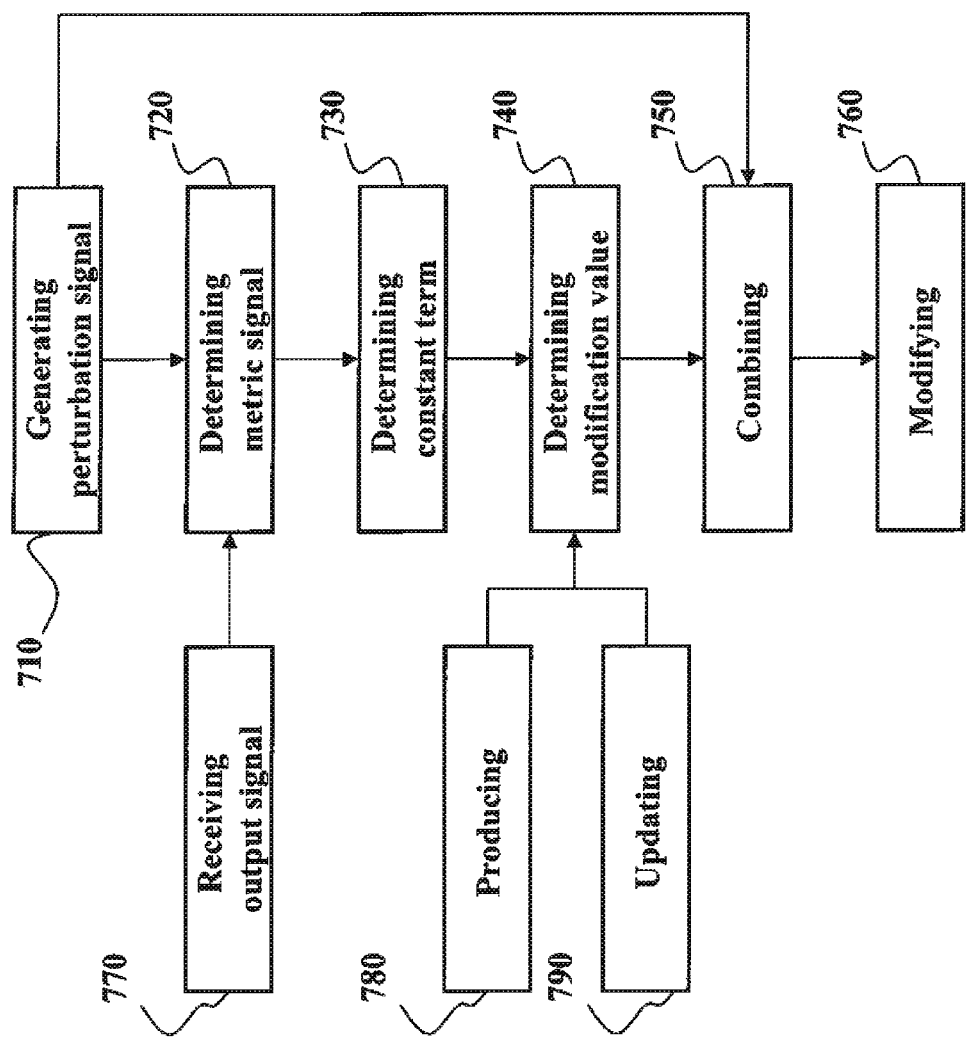
FIG. 7 is a flow chart of method of operation of the optimization controller of FIG. 6.

FIG. 6 shows a block diagram of an optimization controller 600 according to one embodiment of the invention. FIG. 7 shows a flow chart of method of operation of the optimization controller 600. FIGS. 6-7 are provided for illustration purpose only, and are not indented to limit the scope of the invention. In various embodiments, the configuration of the optimization controller includes one or some of the described components.

The optimization controller can include one or some of the following components. A perturbation module 610 for generating 710 a perturbation signal 315, and a receiver 601 for receiving 770 or measuring the output signal 270 of the vapor compression system representing the performance in accordance with the metric of performance. During the operation, the output signal V(t) includes the metric signal B sin(wt) 325 in addition to a nominal value V*.

The optimization controller can include a high-pass filter 620 for determining 720 a metric signal in response to receiving the output signal, and a low-pass filter 630 for determining 730 a constant term of a product 625 of the perturbation signal and the metric signal. The high-pass filter is designed to remove the nominal value V* from the output signal and to produce the metric signal. The metric signal may include other high frequency components originating from other sources such as noise. The metric signal has the same frequency as the perturbation signal and when two sinusoids of the same frequency are multiplied, the resulting expression has a constant term and a sinusoidal term according to $$\sin(wt)*B\sin(wt)=B/2-B/2*\cos(2\,wt).$$

The function of phase, and the slope of the performance curve, is encoded in the constant term B/2. If both sinusoidal signals are in phase (as with $s_2(t)$ 550 and $V_2(t)$ 570 in FIG. 5), then the constant term is positive. However, if the slope of the performance curve at the current operating point is negative, the two sinusoids are out of phase (as with $s_1(t)$ 510 and $V_1(t)$ 530 in FIG. 5) and the right hand side of the above equation has a negative constant term. The optimization controller uses the sign of the constant term B/2 to determine the slope of the performance curve.

Because, in one embodiment, only the constant term the B/2 term is required, the sinusoidal term with twice the perturbation frequency is removed using a low-pass filter 630.

The optimization controller can include an integrator 640 for determining 740 the modification value 350 based on a sign of the constant term 635.

The sign of the constant term indicates if the current modification value s* is too large or too small compared to the value of s that optimizes the value V of the control signal. The integrator 640 integrates the constant term B/2 in order to determine how to change the modification value based on the slope information. In various embodiments, the integrator produces 780 new value of the modification value, or updates 790 a previous value of the modification value.

The optimization controller can also include a gain factor module for multiplying the modification value by a gain factor, wherein a sign of the gain factor depends on the metric of performance. Usually, the multiplication by the gain factor serves two goals. First, the gain factor determines the speed at which the optimization controller reacts to the slope information. For example, a low magnitude of the gain factor causes slow changes to the value of the control signal. Second, the sign of the gain factor determines whether the optimization controller maximizes or minimizes the index of performance. In the embodiments where the performance such as the energy consumption has to be minimized, the sign of gain factor K is negative. When the gain factor K is negative and the constant term is negative then the value of the control signal is increased. This is consistent with searching for a minimum in the performance curve. In the embodiments where the performance has to be maximized, the gain factor K is positive. The gain factor module simplifies adaptation of the optimization controller for different objectives of the vapor compression system.

The optimization controller can also include an optimization module 655 for combining 750 the modification value with the perturbation signal to output the modification signal 315 suitable for modifying the control signal of at least one component of the system, such that the performance is optimized. Some embodiments also include a modification module for modifying the control signal with the modification signal.

In some embodiments, the optimization controller also includes a delay module 660 to accept the perturbation signal. The delay module compensates for delay induced by the dynamics of the vapor compression system. Typically, the delay module is not required if the frequency of the perturbation signal is substantially slower than the dominant dynamics of the vapor compression system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an operation of a vapor compression system, such that a performance of the system measured in accordance with a metric of the performance is optimized, comprising the steps of:
    modifying a control signal with a modification signal including a perturbation signal having a first frequency, wherein the control signal controls a speed of at least one component of the vapor compression system, wherein components of the vapor compression system include a variable speed compressor and a variable speed evaporator fan altering heat transfer coefficients between air and heat exchangers;
    determining a metric signal representing a perturbation in an energy consumption of the vapor compression system, wherein the metric signal has a second frequency substantially equal to the first frequency; and
    adjusting the control signal based on a function of a phase between the perturbation signal and the metric signal, such that the performance is optimized, wherein the adjusting includes decreasing a value of the control signal if the phase is positive, and increasing the value of the control signal if the phase is negative, wherein the steps of the method are performed b a processor.

2. The method of claim 1, wherein the function of the phase includes at least one of a sign of the phase, and a shift of the phase.

3. The method of claim 1, wherein the adjusting comprises:
    determining a modification value; and
    changing a value of the control signal based on the modification value.

4. The method of claim 1 , wherein the adjusting comprises:
    determining a modification value; and
    changing a value of the modification signal based on the modification value.

5. The method of claim 1, wherein the determining further comprises:
    measuring an output signal of the vapor compression system representing the performance; and subjecting the output signal to a high-pass filter to produce the metric signal.

6. The method of claim 1, wherein the adjusting further comprises:
subjecting a product of the perturbation signal and the metric signal to a low-pass filter to produce a constant term of the product, wherein a sign of the constant term corresponds to the function of the phase; and
determining a modification value based on the constant term.

7. The method of claim 6, wherein the determining the modification value further comprises:
integrating the constant term to produce the modification value.

8. The method of claim 6, wherein the determining the modification value further comprises:
integrating the constant term to update the modification value.

9. The method of claim 6, wherein the determining the modification value further comprises:
multiplying the modification value with a gain factor, wherein a sign of the gain factor depends on the metric of performance.

10. The method of claim 6, further comprising:
combining the modification value with the perturbation signal to produce the modification signal.

11. A method for controlling an operation of a vapor compression system, such that a performance of the system measured in accordance with a metric of the performance is optimized, wherein at least one component of the system is controlled based on a control signal, comprising the steps of:
modifying periodically the control signal with a modification signal having a modification value and a perturbation signal, wherein the vapor compression system uses a vapor compression cycle to move refrigerant through components of the vapor compression system, wherein the components include a variable speed compressor and a variable speed evaporator fan, and the control signal controls a speed of the at least one component; and
adjusting adaptively the modification value based on a function of the perturbation signal and a metric signal representing a perturbation in an energy consumption of the vapor compression system caused by the modification signal, wherein the perturbation signal and the metric signal are sinusoidal signals having substantially identical frequency, wherein the adjusting adaptively includes decreasing a value of the control signal, if the phase is positive, and increasing the value of the control signal, if the phase is negative, wherein steps of the method are performed. using a. processor.

12. The method of claim 11, wherein the adjusting further comprises:
determining a product of the perturbation signal and the metric signal, wherein the product includes a constant term and a sinusoidal term; and
updating the modification value based on a sign of the constant term.

13. The method of claim 12, further comprising:
multiplying the modification value by a gain factor, wherein a sign of the gain factor depends on the metric of performance.

14. A vapor compression system, comprising:
an evaporator fan;
a condenser fan, wherein at least one of the condenser fan and the evaporator fan has a variable speed;
an expansion valve;
a compressor having a variable speed; and
an optimization controller, comprising:
a perturbation module for generating a perturbation signal;
a high-pass filter for determining a metric signal in response to receiving an output signal representing an energy consumption of the vapor compression system;
a low-pass filter for determining a constant term of a product of the perturbation signal and the metric signal;
an integrator for determining a modification value based on a sign of the constant term, wherein the sign is positive if the perturbation signal and the metric signal are in phase, and the sign is negative if the perturbation signal and the metric signal are out of phase;
a gain factor module for multiplying the modification value by a gain factor, wherein a sign of the gain factor is negative; and
an optimization module for combining the modification value with the perturbation signal to output the modification signal suitable for modifying a control signal controlling the variable speed of the evaporator fan or the speed of the compressor.

15. The optimization controller of claim 14, further comprising:
a delay module for delaying the output of the modification signal.

16. The optimization controller of claim 14, further comprising:
a receiver for receiving the output signal.

17. The optimization controller of claim 14, further comprising:
a modification module for modifying the control signal with the modification signal.

* * * * *